April 19, 1960 R. C. KRAEPLIN 2,933,171
PILOT ACTUATED DISK CLUTCH
Filed April 17, 1957 3 Sheets-Sheet 1

INVENTOR
Robert C. Kraeplin
By Carlson, Pitzner, Hubbard & Wolfe
ATTORNEY

April 19, 1960 R. C. KRAEPLIN 2,933,171
PILOT ACTUATED DISK CLUTCH
Filed April 17, 1957 3 Sheets-Sheet 2
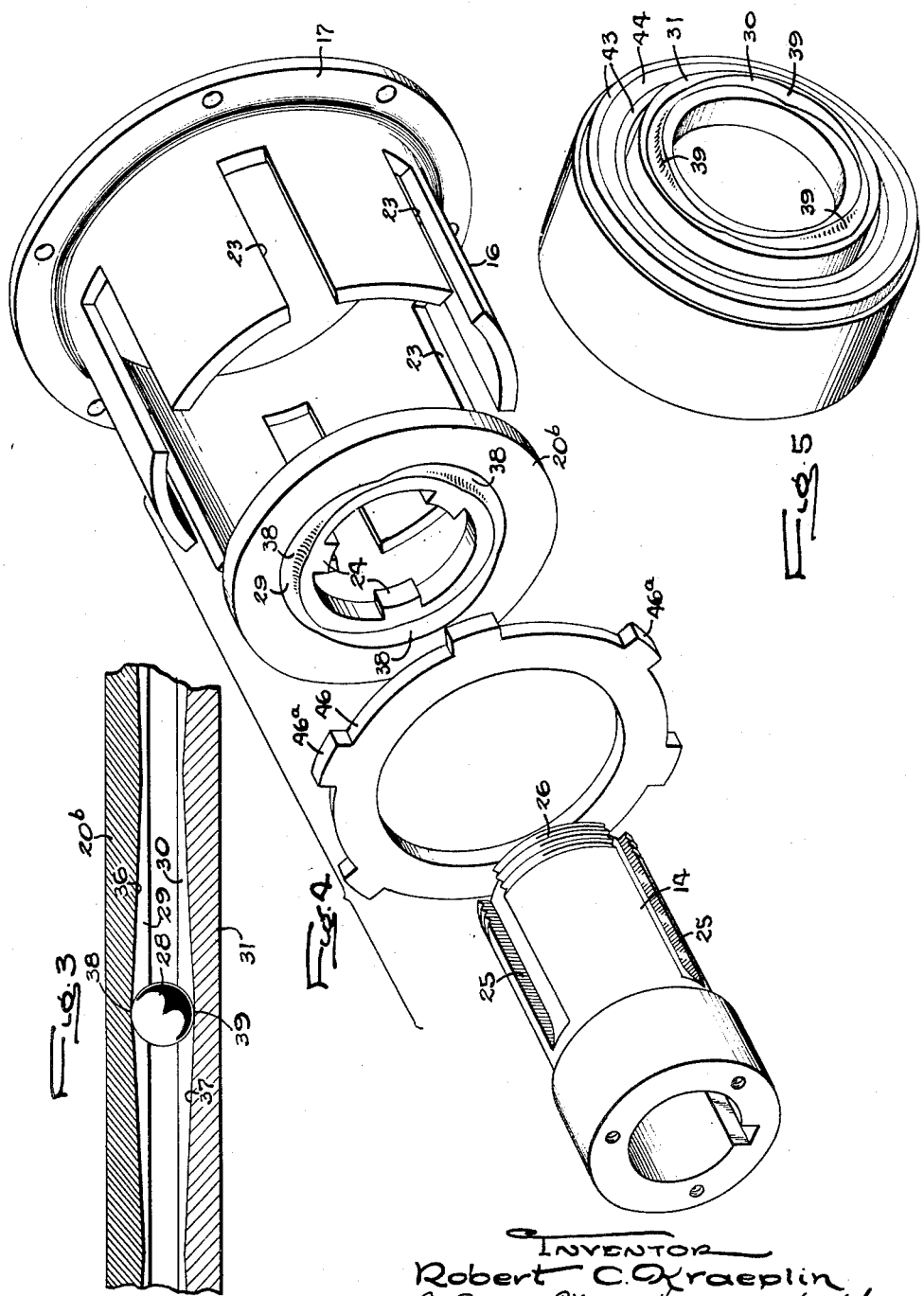
INVENTOR
Robert C. Kraeplin
By Carlson, Pitzner, Hubbard - Wolfe
ATTORNEY

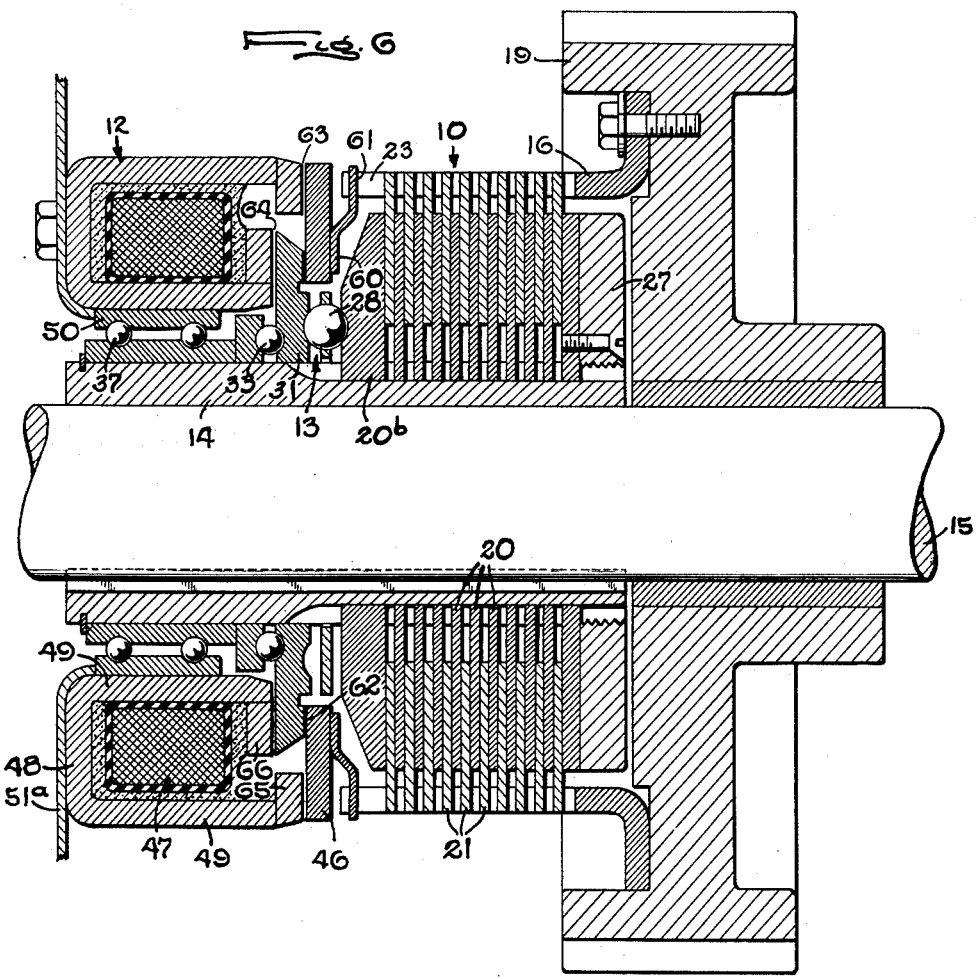

United States Patent Office 2,933,171
Patented Apr. 19, 1960

2,933,171

PILOT ACTUATED DISK CLUTCH

Robert C. Kraeplin, Beloit, Wis.

Application April 17, 1957, Serial No. 653,267

10 Claims. (Cl. 192—35)

This invention relates to friction disk clutches of the type in which a main clutch with axially engageable plates is engaged by the action of a pilot clutch adapted when energized to derive from the driving element of the main clutch a torque which is suitably augmented and utilized to compress the disks of the main clutch together.

The general object of the present invention is to provide a clutch of the above character which, as compared to prior constructions, is simpler and less expensive to construct, which is smaller in size for a given torque transmitting capacity, which is more readily adaptable for electric control of the pilot clutch, and which enables most of the parts to be formed as sheet metal stampings and assembled by simple spline couplings.

Another object is to couple the driving and driven disks of the main clutch to inner and outer concentric sleeves and utilize an extension of the outer sleeve in a novel manner to support and drive one of the elements of the pilot clutch.

The invention also resides in the novel construction and mounting of the parts of the pilot clutch to achieve overall radial compactness and facilitate magnetic control.

Other objects and advantages of the invention will become apparent from the following detailed description taken in connection with the accompanying drawings, in which Figure 1 is a longitudinal central cross-sectional view of a clutch embodying the novel features of the present invention.

Fig. 3 is a fragmentary development view of the ball cam mechanism.

Fig. 4 is an exploded perspective view of certain of the clutch parts.

Fig. 5 is a fragmentary perspective view of part of the ball cam and the pilot clutch.

Fig. 6 is a view similar to Fig. 1 showing a modified form of the pilot clutch.

Figure 1:
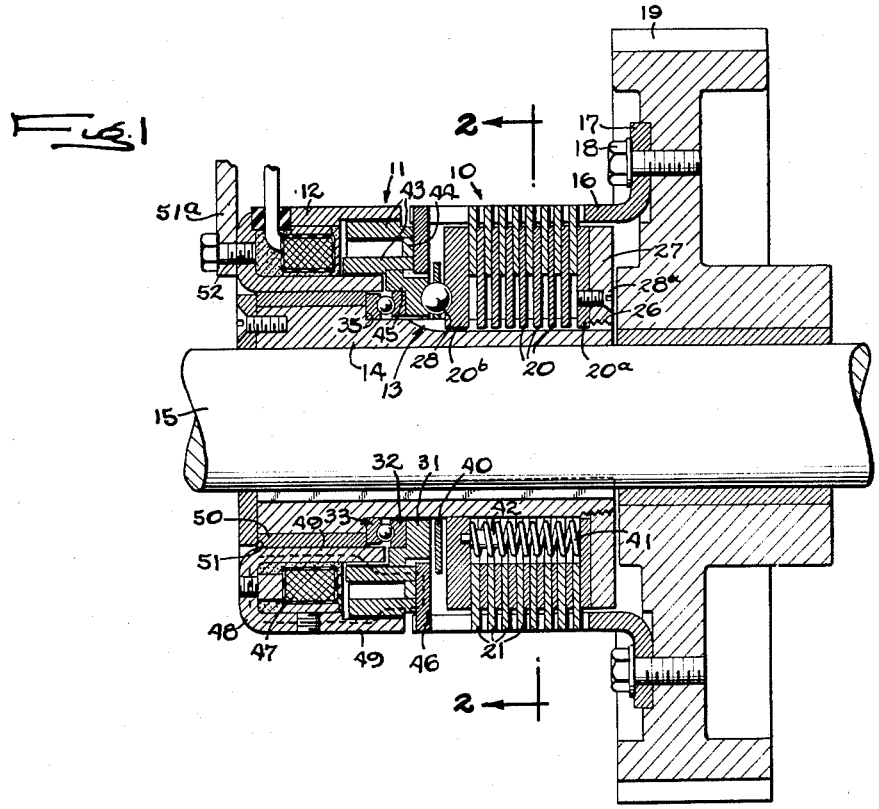
Figure 2:
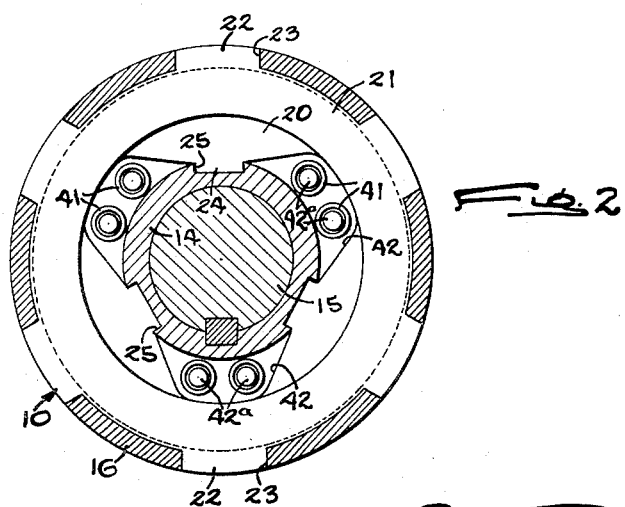
Fig. 2 is a fragmentary section taken along the line 2—2 of Fig. 1.

The improved clutch shown in the drawings for purposes of illustration comprises generally a multiple plate main friction clutch 10 and a double ring pilot friction clutch 11 adapted to be controlled by an electromagnet 12 and operating through a ball cam mechanism 13 to compress and release the plates of the main clutch. In this instance, the driven element of the main clutch comprises a sleeve 14 keyed on a shaft 15 and extending axially through the main clutch, the cam mechanism, the pilot clutch, and the magnet 12. The driving element is a larger sleeve 16 concentric with one end portion of the driven sleeve and projecting beyond the latter for attachment as through a flange 17 and screws 18 to a drive gear 19 journaled on and supported by the shaft 15.

The main clutch comprises two sets of disks or flat rings 20 and 21 of suitable material alternating with each other and respectively spline coupled to the inner and outer sleeves 14 and 16. To this end, the stampings forming the driving disks 21 fit loosely within the outer sleeve with squared lugs 22 around their peripheries disposed in slots 23 which extend longitudinally of the inner end portion of the sleeve 16 and are open at the inner end thereof. In a similar way, lugs 24 around the inner edges of the disks 20 are received in squared spline grooves 25 cut in the corresponding end portion of the driven sleeve.

The desired clearance between the plates of the main clutch may be obtained by axial adjustment of the terminal disk 20ª which is backed by a disk 27 threaded at 26 onto the outer end of the sleeve 14. A screw 28ª seated in the disk 27 and threading into the disk 20ª serves to lock the disks together and thus retain any axial position of adjustment of the disk 20ª which, as above described, is splined onto the inner sleeve.

Engagement of the main clutch is effected by the application of pressure axially on an actuator disk which, in this instance, is the other terminal disk 20ᵇ of the main clutch, this being made somewhat thicker and more rigid so as to distribute the actuating pressure uniformly. The disk 20ᵇ constitutes the follower of the ball cam mechanism 13 which comprises at least three hardened balls 28 disposed in circumferentially extending grooves 29 and 30 in the opposed faces of the terminal disk 20ᵇ and a ring 31. The latter encircles the inner sleeve 14 beyond the spline grooves therein and in the form shown in Fig. 1, is pressed onto the race ring 32 of an anti-friction thrust bearing 33 whose other race ring is pressed onto the sleeve 14 against an abutment 35.

Herein, both of the grooves 29 and 30 are defined by gradually inclined surfaces 36 and 37 of curved radial cross section and converging circumferentially toward each other to apices 38 and 39 in which one ball 28 is disposed when the ring 31 is in the clutch-released position shown in Fig. 3. The balls are held in spaced relation by a cage 40. As the ring 31 is turned in either direction away from the released position, the balls roll up one incline 36 and down the opposed incline 37 resulting in axial shifting of the disk 20ᵇ to energize the main clutch.

When the actuating torque applied to the ring 31 is relieved, the ring is turned back to released position by the action of a plurality of coiled compression springs 41 disposed in angularly spaced notches 42 and extend through the clutch plates 20 and 21 parallel to the clutch axis. Opposite ends of the springs abut against the terminal clutch disks 20ª and 20ᵇ, each spring being centered on a pin 42ª projecting from the disk 20ᵇ. The slope of the cam surfaces 36 and 37 is sufficiently great to insure such release of the main clutch by the springs 41.

In the form shown, the pilot clutch 11 for deriving torque from the driving element of the main clutch and exerting such torque on the cam ring 31 is of the friction type and comprises friction surfaces rotatable with the outer sleeve 16 and the cam ring 31 and adapted for axial gripping engagement in response to energization of the magnet 12. In the form shown in Fig. 1, the driven friction surface is on a ring formed by two cylindrical pole pieces 43 radially spaced apart and rigidly joined together as by brazing to an annulus 44 of nonmagnetic material such as copper. Intermediate its ends the inner pole piece is brazed or otherwise joined rigidly with an outwardly projecting flange 45 formed on the cam ring 31 and offset axially so as to surround the bearing 33.

The pole faces formed by the ends of the pieces 43 are flush with each other and are spanned by and normally in substantial contact with a flat armature ring 46 of magnetic material herein constituting the driver of the pilot clutch and mounted not only for rotation with the driving sleeve 16 but also for free axial floating so as to insure full contact with the pole faces. In accordance with the present invention, this is accomplished by spline coupling the armature ring directly to the end of the sleeve 16 which for this purpose is extended inwardly beyond the actuator disk 20ᵇ and the cam mechanism 13. Thus the armature may, as shown in Figs. 1 and 4, be formed as a simple sheet metal stamping with external teeth 46ᵃ projecting into the slots 23 in the drive sleeve within which the ring fits loosely so as to be centered relative to the clutch axis.

The armature ring and the pole pieces form part of a toroidal flux circuit which as indicated in dotted outline in Fig. 1 encloses a multiple turn annular winding 47 of the magnet 12 and is completed by the magnet core 48. The latter is a ring of U-shaped radial cross section having cylindrical legs 49 which project beyond the winding and, in the form shown in Fig. 1, telescope closely with the pole pieces 43 over the major length thereof and in this instance around the outer and inner peripheries of the outer and inner pole pieces.

To center the magnet accurately and position the same axially, the core 48 is pressed onto a bearing sleeve 50 of nonmagnetic material which may, as shown in Fig. 1, be journaled on the end portion of the driven sleeve 14 between a race of the bearing 33 and a shoulder 51 on the sleeve. The magnet is held against turning in any suitable way as by an arm or disk 51ᵃ atttached by one or more screws threading into holes 52 tapped into the core 48.

When the winding 47 is deenergized, the coacting magnetic forces of the pilot clutch will be disposed close together as shown in Fig. 1 and the actuator ring 31 will be held in clutch released position (Fig. 3) by the springs 41 acting backwardly through the ball cam mechanism. Now, when the winding is energized, magnetic flux will thread the circuit shown in Fig. 1 thus drawing the elements of the pilot clutch into gripping engagement to derive from the driving sleeve a torque which is proportional in magnitude to the energizing current. The torque thus applied to the actuator ring 31 is augmented by the ball cams and converted into an axial pressure exerted on the actuator disk 20ᵇ thereby compressnig the plates of the main clutch against the backing plate 27. The driving and driven sleeves are thus coupled together frictionally for the transmission of torque proportional to the energization of the magnet. When the latter is again deenergized, all of the actuated parts are restored to released position by the action of the springs 47.

In the modification shown in Fig. 6, the parts in common with Fig. 1 are indicated by the same reference numbers. The splining of the armature 46 into the free end of the cantilever mounted drive cup 16 is effected through a sheet metal ring 60 secured as by spot welds against the back of the armature and having teeth 61 projecting outwardly into the notches 23 in the drive cup.

Only one pair of friction faces is employed in this instance, these being at the inner periphery of the armature ring and the outer margin of the cam 31 which is relatively flat and axially fixed by the bearing 33 but adapted for axial gripping engagement with the armature face. If desired, the latter may be covered by a thin strip 62 of non-metalic wear material.

In this modification, the gaps 63, 64 between the pole legs 49 of the magnet core and the armature and cam ring are disposed in axial planes and offset axially from each other. The gap 63 is defined by the outer marginal portion of the armature face and a flange 65 turned inwardly from the outer leg of the core and lying in the plane of the cam ring 31. The other gap 64 is defined by the face of the cam ring opposite the armature and the outer face of a flange 66 turned outwardly from the inner leg of the core. The narrow width of this gap is maintained by the mounting bearings 33 and 67 of the cam ring and the magnet core. The axial gap 63 maintained by virtue of the engagement of the armature and cam rings.

As shown in phantom in Fig. 6, the stationary core, the cam ring and the armature form a toroidal path through which magnetic flux threads when the winding 47 is energized. The rotating armature and cam ring are thus drawn into the axial gripping engagement to derive the torque for turning the cam ring to apply the main clutch as previously described.

In both forms of the improved clutch as above described, most of the parts may be formed as simple stampings and therefore at low cost. They are splined and telescoped together easily to produce an overall arrangement which is exceedingly compact and of minimum size both axially and radially for a given torque capacity. Thus, all of the parts except the outer drive cup 16 may be assembled into their final operative positions onto the inner sleeve 14 and shipped as a unitary assembly for final association with the drive cup which may, if desired, be supplied by the ultimate user. This is possible by virtue of the intended cantilever mounting of the drive sleeve thus leaving the overhanging end free for ready insertion of the clutch assembly.

It will also be observed that gripping surfaces of the pilot clutch are substantially smaller in diameter than the drive cup as a result of which the main and pilot clutches when arranged end to end form a cylindrical unit which is of substantially uniform diameter throughout its length.

This application is a continuation-in-part of my copending application Serial No. 370,921 filed July 29, 1953.

I claim as my invention:

1. In a multiple disk friction clutch having, in combination, concentric inner and outer sleeves of different sizes mounted for relative rotation about a common axis and splined exteriorly and interiorly respectively, a disk disposed between said sleeves and mounted on the inner sleeve for axial movement, a thrust ring journaled on said inner sleeve adjacent said disk, a cam and a follower therefor to move said disk axially in response to turning of said thrust ring away from a normal clutch-released position, an armature ring of magnetic material coupled to said outer sleeve for free axial floating of the armature while rotating with the sleeve, at least one axially facing magnetic pole piece rotatable with said thrust ring and adapted for axial gripping engagement with said armature ring, a stationarily mounted electromagnet having a winding encircling said axis and pole pieces cooperating with said pole piece and said armature ring to form a toroidal flux path, and a main friction clutch engaged and released in response to axial movement of said disk in opposite directions and comprising sets of disks alternating with each other and respectively spline coupled to said inner and outer sleeves.

2. A clutch having, in combination, outer and inner concentric driving and driven sleeves, a main friction clutch comprising sets of disks alternating with each other and respectively splined into the interior and exterior of said outer and inner sleeves, an actuator disk slidable axially on said inner sleeve to apply and release said clutch, said outer sleeve having a splined end portion projecting axially past and beyond said actuator disk, a pilot friction clutch including an axially fixed driven ring journaled on said inner sleeve and a second ring received in and supported by said end portion of said outer sleeve and splined in the latter for axial floating movement and gripping engagement with the opposed face of said fixed ring, an electromagnetic actuator for said pilot clutch having a diameter smaller than that of said driving sleeve and mounted on said driven sleeve on the side of said driven ring opposite said main clutch, said actuator being selectively operable to draw said rings into gripping engagement whereby to turn said driven ring away from a normal clutch-released position, and cam means responsive to such turning of said driven ring to shift said actuator disk axially and engage said main clutch.

3. A clutch having, in combination, an elongated inner sleeve, a nonrotatable magnet core surrounding one end portion of said sleeve and having pole members concentric with each other and with said sleeve, a pole ring axially fixed and journaled on said sleeve and having at least one magnetic pole piece terminating in an axially facing pole face, an outer sleeve surrounding and concentric with the opposite end portion of said inner sleeve, means rotatably supporting said outer sleeve cantilever fashion with the free end thereof terminating adjacent said pole face, a main friction clutch comprising sets of disks alternating with each other and respectively splined into and onto said outer and inner sleeves, an actuator disk slidable axially on said inner sleeve to apply and release said clutch, said free end portion being splined and projecting axially past and beyond said actuator disk, a magnetic armature ring spline coupled to and supported by said free sleeve end for free axial floating and adapted to be drawn into axial gripping engagement with said pole face by magnetic flux threading a toroidal path through said magnet core, said pole piece and said armature ring, and cam means responsive to turning of said pole and armature rings in unison about said axis to shift said actuator disk axially and engage said main clutch.

4. A clutch having, in combination, an outer sleeve splined at one end, means spaced from said end and supporting said sleeve cantilever fashion for turning about the sleeve axis, an inner sleeve longer than and projecting through said outer sleeve and rotatable about said axis, a main friction clutch comprising sets of disks alternating with each other and respectively splined into and onto said outer and inner sleeves, an actuator disk slidable axially on said inner sleeve to apply and release said main clutch, a magnetic armature ring coupled to and supported by said free sleeve end for free axial floating and for rotation with the sleeve, means including a magnetic ring having a pole face opposing said armature and coacting therewith to provide a toroidal flux path of smaller diameter than said outer sleeve, said last mentioned means including an axially fixed part journaled on the projecting end portion of said inner sleeve, flux-producing means mounted on said inner sleeve and operable to energize said rings magnetically whereby to draw said rings into frictional gripping engagement, and cam means responsive to turning of said rings in unison to shift said actuator disk axially and engage said main clutch.

5. A clutch having, in combination, an outer sleeve splined at one end, means supporting said sleeve cantilever fashion from its other end to turn about the sleeve axis, a rotatable inner sleeve projecting through said outer sleeve beyond the free splined end thereof, a main friction clutch comprising sets of disks alternating with each other and respectively splined into and onto said outer and inner sleeves, an actuator disk slidable axially on said inner sleeve to apply and release said main clutch, a magnetic armature ring spline coupled to and supported by said free sleeve end for free axial floating, an axially fixed ring journaled on the projecting end portion of said inner sleeve and carrying at least one pole piece terminating in a face opposing said armature, a nonrotatable annular magnet core surrounding said inner sleeve and having concentric pole members coacting with said armature and pole piece to provide a toroidal flux circuit of smaller diameter than said outer sleeve, means for energizing said flux circuit whereby to draw said armature and pole piece into frictional gripping engagement, and cam means responsive to turning of said rings in unison to shift said actuator disk axially and engage said main clutch.

6. A clutch as defined in claim 5 in which said magnet core and said outer sleeve are of substantially equal diameters and are arranged in end to end relation.

7. A clutch having, in combination, an elongated inner shaft, a nonrotatable magnet core concentric with and surrounding one end portion of said shaft and having inner and outer concentric poles, an outer sleeve surrounding and concentric with the opposite end portion of said shaft, means supporting said sleeve with the inner end terminating short of and axially spaced from said magnet core and said poles, a main friction clutch comprising sets of disks alternating with each other and respectively splined into and onto said sleeve and shaft, an actuator disk disposed between said main clutch and said core and slidable axially on said shaft to apply and release said clutch, said inner end portion of said sleeve being splined and projecting axially past said actuator disk, a pilot clutch disposed between said core and said inner sleeve end and having driving and driven members rotatable relative to each other and adapted, by energization of said core to be coupled together to derive an actuating torque, a first one of said members including an axially fixed part journaled on said shaft, the second member being spline coupled to said inner sleeve end for rotation with the sleeve, cam means responsive to turning of said first member relative to said shaft during activation of said pilot clutch to shift said actuator disk axially and engage said main clutch, said disks, said cam means, said pilot clutch, said magnet core and said shaft constituting a unitary assembly insertable in said sleeve and withdrawable therefrom as a unit by virtue of the spline coupling between said sleeve and said first member.

8. A friction clutch having, in combination, an outer sleeve supported for turning about the sleeve axis, a rotary shaft longer than and projecting through and beyond said sleeve and rotatable about said axis, a main friction clutch comprising groups of disks alternating with each other and respectively splined into and onto said sleeve and shaft, a pilot clutch mounted on and supported by the extended end of said shaft with a portion thereof disposed beyond the free end of said sleeve, said pilot clutch including a ring rotatably supported by said shaft and axially fixed relative thereto, a second ring, means on said free end of said sleeve coupling said second ring to said sleeve for turning of the two in unison while permitting free floating of the ring axially of the sleeve, electrically controllable means for coupling said rings to derive a torque for turning the first ring, and cam means for receiving said torque of said pilot clutch and applying the same to compress said disks together and engage said main clutch.

9. A friction clutch having, in combination, an outer rotary sleeve, a rotary shaft longer than said sleeve and projecting through the sleeve along the axis thereof and beyond the inner free end of the sleeve, a main friction clutch comprising groups of disks alternating with each other and respectively splined into and onto said sleeve and shaft, a pilot friction clutch supported by the extended end of said shaft with part of the pilot clutch disposed beyond said free sleeve end, said pilot clutch having axially engageable friction surfaces and including a magnet having axially projecting inner and outer pole legs concentric with each other and with said shaft, an armature and driving ring detachably coupled to said free sleeve end for turning therewith while free to float axially relative to the sleeve, and cam means for receiving torque from said pilot clutch when the latter is engaged by energization of said magnet and applying such torque to compress said disks together and engage said main clutch, said main and pilot clutches and said cam means constituting a self-contained assembly carried on said shaft and insertable therewith as a unit to bring the outer ones of said disks and said ring into coupled relation with respect to said sleeve.

10. A friction clutch having, in combination, an outer rotary sleeve, a rotary shaft longer than said sleeve and projecting through the sleeve along the axis thereof and beyond the inner free end of the sleeve, a main friction clutch comprising groups of disks alternating with each other and respectively splined into and onto said sleeve and shaft, a pilot friction clutch supported by the extended end of said shaft with part of the pilot clutch disposed beyond said free sleeve end, said pilot clutch having axially engageable friction surfaces and including a magnet having axially projecting inner and outer pole legs concentric with each other and with said shaft, an armature and driving ring detachably coupled to said free sleeve end for turning therewith while free to float axially relative to the sleeve, and cam means for receiving torque from said pilot clutch when the latter is engaged by energization of said magnet and applying such torque to compress said disks together and engage said main clutch, said sleeve being formed with angularly spaced spline grooves extending to and opening at said free sleeve end and receiving complemental spline teeth formed around the peripheries of said driving ring and the outer ones of said disk.

References Cited in the file of this patent
UNITED STATES PATENTS

| | | |
|---|---|---|
| 2,091,270 | Colman | Aug. 31, 1937 |
| 2,780,893 | Seborg et al. | Feb. 12, 1957 |